(12) United States Patent
Zhang et al.

(10) Patent No.: US 12,468,043 B2
(45) Date of Patent: Nov. 11, 2025

(54) LiDAR RESONATOR WITH DYNAMIC FORCE EQUILIBRIUM

(71) Applicant: GM GLOBAL TECHNOLOGY OPERATIONS LLC, Detroit, MI (US)

(72) Inventors: Qijun Zhang, Canton, MI (US); Mark A. Stebbins, Bloomfield Township, MI (US); Srinivasa Rao Molleti, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 825 days.

(21) Appl. No.: 17/806,304

(22) Filed: Jun. 10, 2022

(65) Prior Publication Data

US 2023/0400587 A1  Dec. 14, 2023

(51) Int. Cl.
| | |
|---|---|
| *G01S 17/93* | (2020.01) |
| *G01S 7/484* | (2006.01) |
| *G01S 7/4861* | (2020.01) |
| *G01S 17/931* | (2020.01) |
| *H02K 41/035* | (2006.01) |

(52) U.S. Cl.
CPC ............ *G01S 17/931* (2020.01); *G01S 7/484* (2013.01); *G01S 7/4861* (2013.01); *H02K 41/0354* (2013.01)

(58) Field of Classification Search
None
See application file for complete search history.

(56) References Cited

U.S. PATENT DOCUMENTS 11,835,656 B2 * 12/2023 Pei ..................... G01S 17/89

* cited by examiner

*Primary Examiner* — Hovhannes Baghdasaryan
(74) *Attorney, Agent, or Firm* — Ingrassia Fisher & Lorenz, LLP | IF&L (57) ABSTRACT

A LiDAR resonator with dynamic force equilibrium that includes a spring fork mechanism having a first tine and a second tine with the same stiffness as the first tine, wherein the spring fork mechanism is configured to resonate at a resonant frequency, an optical module, mounted to the first tine, for transmitting a light pulse and receiving a reflection of the light pulse, a voice coil, also mounted to the first tine, for generating an alternating magnetic field at the resonant frequency, a counterweight, mounted to the second tine, having a mass and CG equal to a mass and CG of the combined optical module and the voice coil, and a signal source for coupling an alternating current signal at the resonant frequency to the voice coil such that the voice coil is operative to generate an alternating magnetic force at the resonant frequency between the voice coil and the counterweight.

20 Claims, 5 Drawing Sheets

LiDAR RESONATOR WITH DYNAMIC FORCE EQUILIBRIUM

INTRODUCTION

The technical field generally relates to Light Detection and Ranging (LiDAR) resonators, and more particularly relates to a method and apparatus for providing dynamic force equilibrium in a LiDAR resonator.

The operation of modern vehicles is becoming more automated, i.e. able to provide driving control with less and less driver intervention. Vehicle automation has been categorized into numerical levels ranging from zero, corresponding to no automation with full human control, to five, corresponding to full automation with no human control. Various automated driver-assistance systems, such as cruise control, adaptive cruise control, and parking assistance systems correspond to lower automation levels, while true "driverless" vehicles correspond to higher automation levels.

Increasingly, vehicles are being equipped to determine the environment around them autonomously or semi-autonomously using onboard sensors. A LiDAR is a surveying technology that measures distance by illuminating a target with a laser light. LIDAR has a greater spatial resolution than a RADAR due to the shorter wavelength of the transmitted signal. However, LiDAR systems must transmit and receive a laser light at every point of resolution for the depth map making high resolution scans at long distances overly time consuming. To rotate and aim the laser transmitter, current LiDAR systems use stepper motors which may be unreliable over long periods of time and under harsh environmental conditions. Accordingly, it is desirable to provide a stable LiDAR scanning mechanism that avoids noise and vibration, while providing robust operation. Furthermore, other desirable features and characteristics of the present disclosure will become apparent from the subsequent detailed description and the appended claims, taken in conjunction with the accompanying drawings and the foregoing technical field and background.

SUMMARY

An apparatus is provided for providing a LiDAR resonator with dynamic force equilibrium. In one embodiment, the apparatus includes a spring fork mechanism having a first tine and a second tine wherein the spring fork mechanism is configured to resonate at a resonant frequency and wherein a stiffness of the first tine equals a stiffness of the second tine, an optical module, mounted to the first tine, configured to transmit a light pulse and receiving a reflection of the light pulse, a voice coil, mounted to the first tine, configured to generate an alternating magnetic force at the resonant frequency, a counterweight, mounted to the second tine, having a mass and center of gravity equal to a mass and center of gravity of the optical module and the voice coil, wherein the counterweight includes a magnet, and a signal source configured to couple an alternating current signal at the resonant frequency to the voice coil such that the voice coil is operative to generate the alternating magnetic force at the resonant frequency between the voice coil and the counterweight.

In accordance with another aspect of the present disclosure wherein the alternating magnetic force sustains a resonance of the spring fork mechanism.

In accordance with another aspect of the present disclosure wherein the alternating magnetic force sustains an out of phase resonance of the spring fork mechanism.

In accordance with another aspect of the present disclosure wherein the voice coil is integrated with the optical module.

In accordance with another aspect of the present disclosure wherein the signal source is integrated with the voice coil.

In accordance with another aspect of the present disclosure wherein the signal source is integrated with the optical module.

In accordance with another aspect of the present disclosure wherein the light pulse is transmitted at a plurality of positions in response to a lateral and vertical motion of the first tine.

In accordance with another aspect of the present disclosure further comprising a lens mechanically coupled to a base of the spring fork mechanism such that the light pulse is transmitted through the lens.

In accordance with another aspect of the present disclosure wherein the spring fork mechanism is resonant at 125 Hz.

A method is provided for controlling a LiDAR resonator with dynamic force equilibrium. In one embodiment, the method includes mechanically coupling a voice coil and an optical module to a first tine of a spring fork mechanism and a counterweight to a second tine of the spring fork mechanism wherein the spring fork mechanism has a resonant frequency, inducing, by the voice coil, an alternating magnetic force between the optical module and the counterweight to sustain a resonance of the spring fork mechanism at the resonant frequency, transmitting, by the optical module, a first light pulse at a first angle in response to a first position of the first tine and a second light pulse at a second angle in response to a second position of the first tine, generating a depth map in response to a reflection of the first light pulse received by the optical module at the first position and a reflection of the second light pulse received by the optical module at the second position, and controlling a vehicle in response to the depth map.

In accordance with another aspect of the present disclosure wherein the voice coil is integrated within the optical module.

In accordance with another aspect of the present disclosure wherein the counterweight is magnetic.

In accordance with another aspect of the present disclosure wherein the first light pulse and the second light pulse are transmitted through a lens mechanically coupled to a non-resonant portion of the spring fork mechanism.

In accordance with another aspect of the present disclosure further including coupling a signal, from a signal source, to the voice module at the resonant frequency.

In accordance with another aspect of the present disclosure wherein the spring fork mechanism forms part of a LiDAR resonator.

In accordance with another aspect of the present disclosure wherein the vehicle is controlled in response to an assisted driving algorithm.

In accordance with another aspect of the present disclosure wherein the voice coil is operative to induce an out of phase resonance of the spring fork mechanism.

In accordance with another aspect of the present disclosure wherein the optical module is mounted to an end of the first tine of the spring fork mechanism.

In accordance with another aspect of the present disclosure, a vehicle including a lidar including a spring fork mechanism having a first tine with a first stiffness and a second tine with the first stiffness, wherein the spring fork mechanism is configured to resonate at a resonant frequency, an optical module, mounted to the first tine, for transmitting a light pulse and receiving a reflection of the light pulse, a voice coil, mounted to the first tine, for generating an alternating magnetic field at the resonant frequency, and a counterweight, mounted to the second tine, having a mass and center of gravity equal to a mass and center of gravity of the optical module and the voice coil, a signal source for coupling an alternating current signal at the resonant frequency to the voice coil such that the voice coil is operative to generate an alternating magnetic force at the resonant frequency between the voice coil and the counterweight, a processor for generating a depth map in response to a transmission time of the light pulse and a detection time of the reflection of the light pulse, a memory for storing the depth map, and a vehicle controller for controlling the vehicle in response to an assisted driving algorithm and the depth map.

In accordance with another aspect of the present disclosure wherein the alternating magnetic force sustains an out of phase resonance of the spring fork mechanism.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
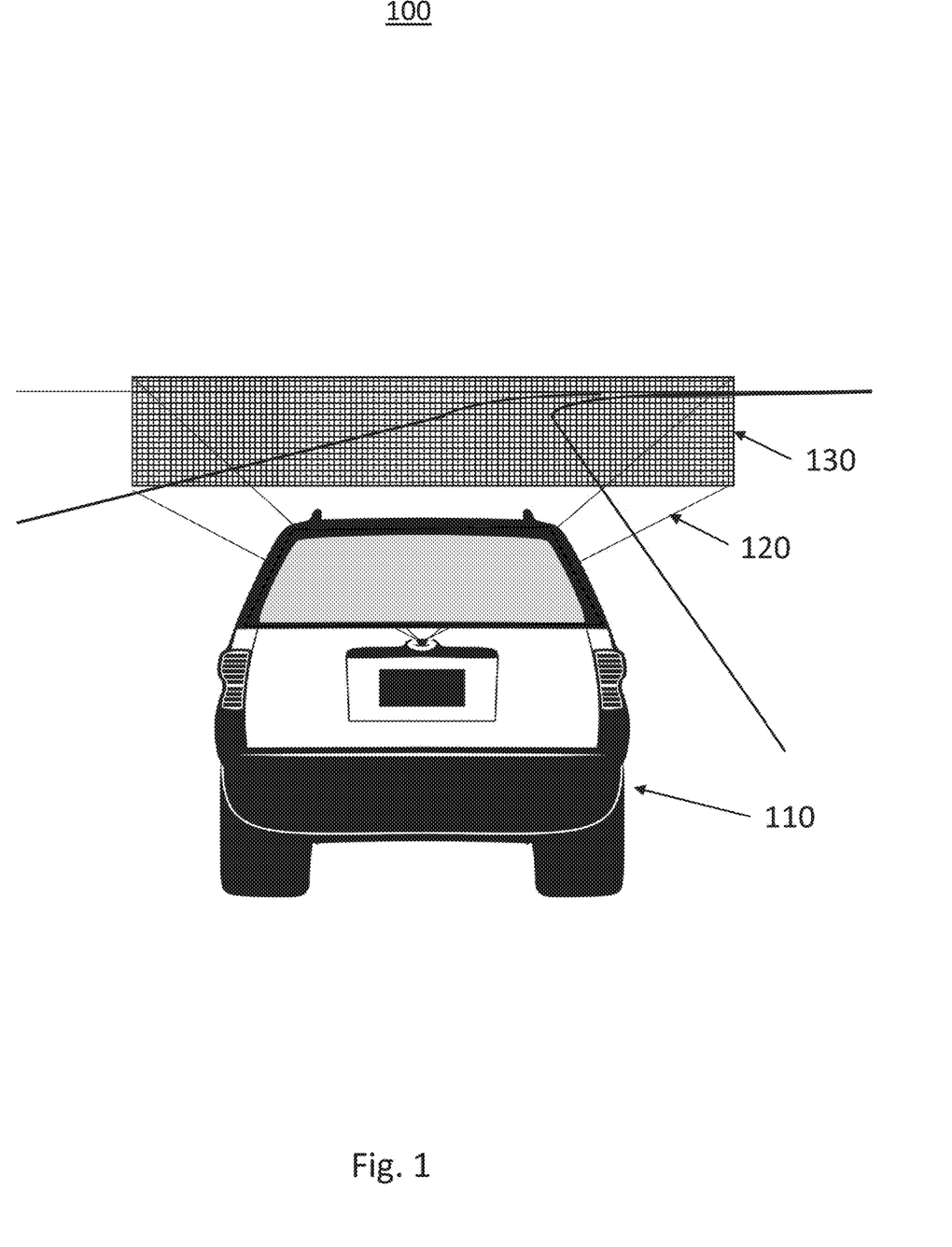
FIG. 1 is an exemplary environment for employing a LiDAR system in a host vehicle including a LiDAR resonator with dynamic force equilibrium in accordance with an embodiment.

Turning now to FIG. 1, an exemplary environment 100 for employing a LiDAR system in a host vehicle 110 including a LiDAR resonator with dynamic force equilibrium is shown in accordance with various embodiments. In some exemplary embodiments, the LiDAR system within the host vehicle 110 is configured to generate a depth map of a two dimensional field of view 130. While the exemplary field of view 130 is shown as a forward facing field of view, the system is applicable to any field of view. An area of the field of view 130 is by a range of angles of view 120 of the LiDAR transceiver.

The exemplary LiDAR system employs a plurality of fixed LiDAR transceivers, each having a field of view coving a portion of the field of view 130. For example, each LiDAR transmitter may capture depth measurements at 16 horizontal points and 4 vertical points. The fields of view of each of the fixed LiDAR transceivers may be partially overlapping to facilitate alignment across fields of view or may have contiguous fields of view to increase resolution and decrease scan time for the field of view 130.

A LiDAR transceiver typically comprises an optical module having a laser emitter, and a light detector. A lens, mirrors, and/or mechanical scanner may be used to focus and direct a light pulse transmitted from the fixed lidar system at a desired azimuth and elevation. A pulse of reflected light is directed back through the same lens and/or mirror mechanism to a detector. The time of flight of the transmitted light pulse and the reflected light pulse are used to determine a distance, or depth, to a surface at the azimuth and elevation angles. This distance is then combined with detections made at other azimuth and elevation angles to generate a depth map. The distance and/or angle between the detections is called the resolution. Higher resolution depth maps include more depth points for a given area wherein lower resolutions depth maps include less depth points for the given area. Higher resolution depth maps require more time to acquire and process. Therefore very high resolution depth maps may be impractical for use in real time operations, such as control of an autonomous vehicle.

Figure 2:
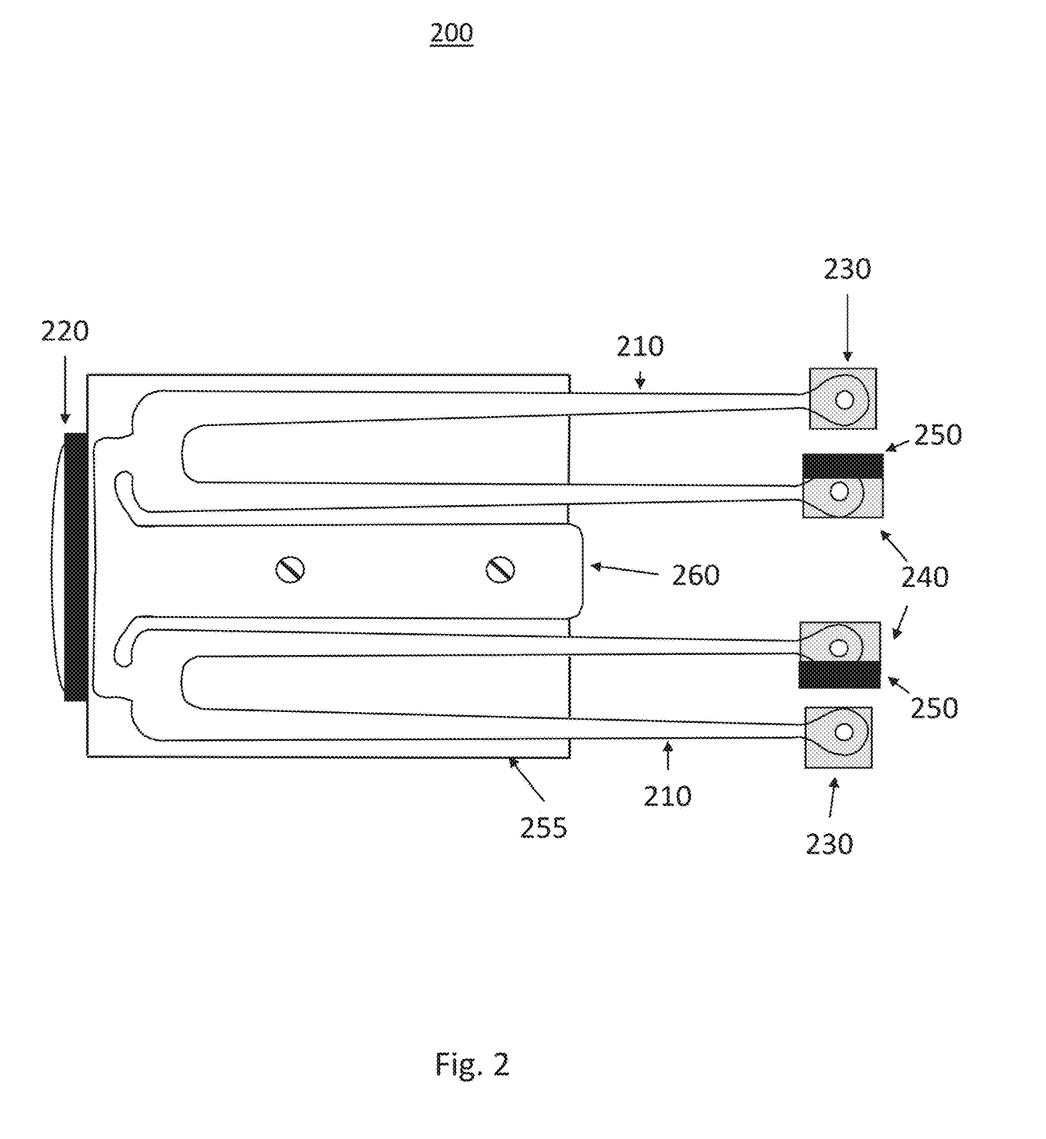
FIG. 2 is an exemplary LiDAR resonator with dynamic equilibrium design in accordance with an embodiment.

Turning now to FIG. 2, an exemplary LiDAR resonator 200 with dynamic equilibrium design is shown in accordance with various embodiments. The exemplary LiDAR resonator includes a lens 220, a base structure 255, two optical modules 230, two counterweights 240 and two voice coils 250, and two, two pronged resonant forks 210.

In some exemplary embodiments, the LiDAR resonator 200 includes a resonant structure having two, two pronged resonant forks 210 and an attachment tab 260 for affixing the resonant structure to a base structure 255. The resonant structure is configured to achieve the dynamic equilibrium by internal operational force cancelation between the two prongs of each resonant fork 210. Each of the two pronged resonant forks 210 is configured to receive an optical module 230, a counterweight 240 and a voice coil 250. A lens 220 is positioned at one end of the base structure 255, opposite from the prong ends of the two pronged resonant fork, the optical module 230 and voice coil 250, the counterweight 240 and magnet.

In some exemplary embodiments, the two pronged resonant forks 210, are spring forks configured to be resonant at the desired LiDAR scanning frequency of the optical module 230. The counterweight 240 is configured to balance the weight of the optical module 230 on one prong with the voice coil 250 and the counterweight 240 on the opposite prong with the magnet. The balanced masses with the same CGs at each end of the two prongs facilitate resonance at the desired frequency. In some exemplary embodiments, the desired resonant frequency is 125 Hz in the lateral direction and 120 Hz in the vertical direction. The voice coil 250 is configured to provide an alternating magnetic field between the optical module 230 and the counterweight 240 in order to start and maintain resonance at the desired frequency.

In response to the vibration of the resonant fork, each of the optical modules 230 are laterally and vertically displaced, thereby altering a location of incidence of an emitted light pulse from the optical module 230 onto the lens 220. In turn, the lens 220 is configured to focus and transmit the incident light pulse in order to achieve a desired scan area for the emitted and received light pulses from the LiDAR resonator 200. The optical module 230 is further configured with an optical detector to detect the received light pulse in order to determine a range for the desired scan area. The range at the desired scan area is then used with other detected ranges to generate a depth map for use by a vehicle controller.

In some exemplary embodiments, the LiDAR resonator 200 is configured to integrate a voice coil 250 with the optical module 230 and a magnet with the counterweight 240 so that the LiDAR operational force is eliminated. The counterweight 240 and the optical module 230 form a two connected single degree freedom system in each direction (vertical and lateral independently) with the two pronged resonant fork 210. With the exemplary counterweight 240 and the optical module 230/voice coil 250 configuration, only the out-phase motion is excited with no in-phase motion content.

Previously, voice coils had been mounted to a base structure of legacy LiDAR resonators. Mounting the voice coil on the base structure generated an unbalanced force between one prong of the two pronged resonant fork and the base structure. This unbalanced force resulted in excess noise and vibration which was perceptible by vehicle cabin occupants. In addition, the unbalanced forces increased power consumption of the voice coil mounted to the base structure and could reduce operational efficiency and/or robustness of the legacy LiDAR resonator. To address these problems, the exemplary LiDAR resonator 200 has been configured with a voice coil 250, optical module 230 and counterweight 240 mounted to the ends of the prongs of the two pronged resonant forks 210 in a weight balanced configuration. Thus, when the voice coil 250 induces the resonant mode of the two pronged resonant fork 210, equal and opposing force is applied to each of the spring forks. Advantageously, by providing balanced and opposing force between the two forks, the forks move out of phase with each other, thereby further balancing the forces in the resonant fork and further reducing noise and vibration of the LiDAR resonator 200.

Modal analysis of the exemplary two pronged resonant fork 210 indicates two possible types of modes, one is in-phase mode with the counterweight 240 and the optical module 230 moving in the same direction, the other out-phase mode with the counterweight 240 and the optical module 230 moving in opposite directions. By moving the voice coil 250 to be collocated with the optical module 230, the excitation of the counterweight 240 includes action/reaction forces which are always equal but in opposite directions, with the total force on a base of the two pronged resonant fork 210 perfectly canceled due to the same mass, CG and stiffness on each of the two prongs. Thus, the effect of the in-phase modal vibration on the base structure 255 is eliminated. The exemplary LiDAR resonator 200 has a state of dynamic equilibrium as both in-phase and out-phase motion will minimize vibration to the base structure 255 and the vehicle structure overall. This dynamic equilibrium may further reduce the power consumption by producing the same amount of motion on the optical module 230 for laser scanning with less applied force by the voice coil 250.

Figure 3:
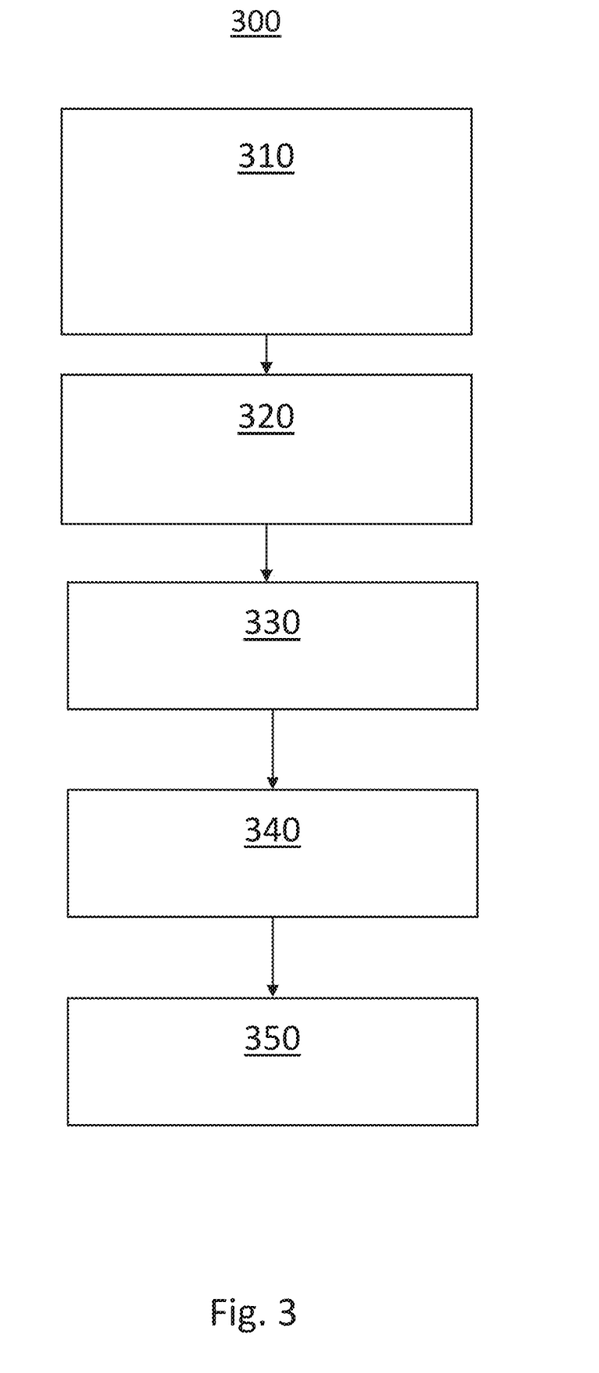
FIG. 3 is a method for controlling a LiDAR resonator with dynamic equilibrium design in accordance with an embodiment.

Turning now to FIG. 3, an exemplary method 300 for controlling a LiDAR resonator with dynamic equilibrium design is shown in accordance with various embodiments.

The method is first operative for mechanically coupling 310 a voice coil and an optical module to a first tine of a spring fork mechanism and a counterweight and magnet to a second tine of the spring fork mechanism wherein the spring fork mechanism has a resonant frequency. In some exemplary embodiments, the voice coil and optical module may be mechanically coupled to a distal end of the tine, farthest from a base of the spring fork mechanism. Coupling the optical module to the distal end of the tine results in the greatest lateral and vertical movement for the optical module when the spring fork mechanism is in its resonant state. A lens for focusing and establishing a desired transmit angle may be mechanically coupled to the base of the spring fork mechanism, either directly, or through a support structure.

The voice coil is next operative for inducing 320 an alternating magnetic force between the optical module and the counterweight to sustain a resonance of the spring fork mechanism at the resonant frequency. The voice coil may be positioned such that the alternating magnetic force is directed towards the counterweight resulting in a balanced, out of phase resonance of the spring fork mechanism. The counterweight may be a magnet, may include a magnet, or may have a magnetic surface to improve the efficiency of the voice coil operation, thereby reducing power and increasing system longevity. In some exemplary embodiments, the voice coil may be integrated within the optical module, or may receive power and/or an alternating current signal from the optical module.

The method is next operative for transmitting, 330 by the optical module, a first light pulse at a first location in response to a first position of the first tine and a second light pulse at a second location in response to a second position of the first tine. The transmit beam angle of the optical module is altered in response to the lateral and vertical movement of the first tine of the optical module resulting from the lateral and vertical movement of the first tine during the resonant mode of the spring fork mechanism. The transmitted light pulses from the optical module have differing locations of incidence on the lens resulting in different light pulse transmission locations from the lens towards the field of view. In some exemplary embodiments, the first light pulse and the second light pulse are transmitted through a lens mechanically coupled to a non-resonant portion of the spring fork mechanism.

A depth map is next generated 340 in response to a reflection of the first light pulse received by the optical module at the first position and a reflection of the second light pulse received by the optical module at the second position. The time of propagation of the light pulses between transmission of the light pulse and detection of a reflection from the light pulse is used to determine a distance to a surface at the light pulse transmission angle.

The method is next operative for controlling 350 a vehicle in response to the depth map. The depth map may be used to generate a point cloud of an area proximate to the vehicle. The vehicle is controlled in response to an assisted driving algorithm using the depth map, the point cloud, global positioning system (GPS) data, and/or map data stored in a memory. In some exemplary embodiments, the assisted driving algorithm may be an adaptive cruise control algorithm.

Figure 4:
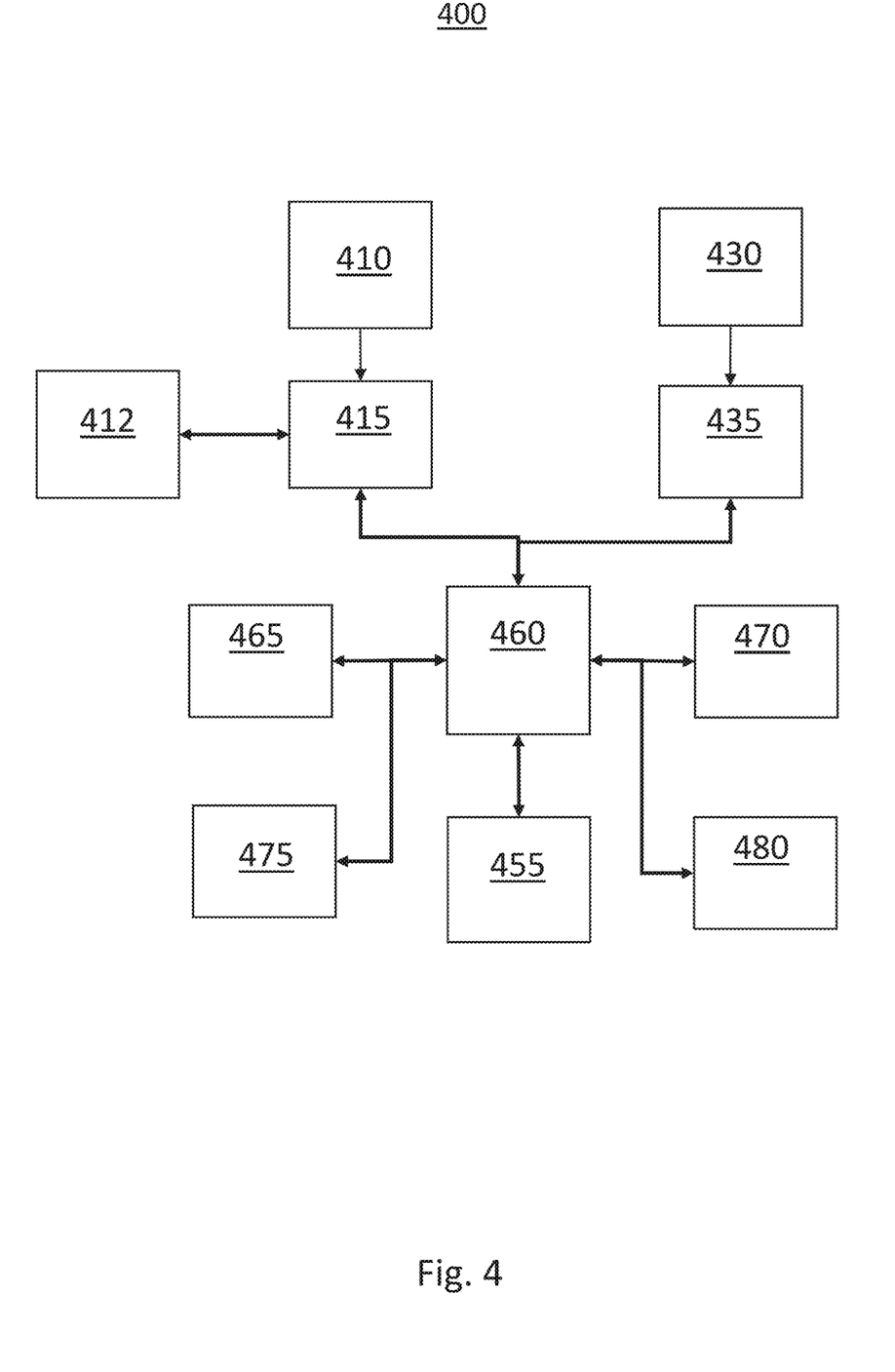
FIG. 4 is an exemplary vehicle system including a LiDAR resonator system with dynamic equilibrium design in accordance with an embodiment.

Turning now to FIG. 4, an exemplary vehicle system 400 including a LiDAR resonator with dynamic equilibrium design is shown in accordance with various embodiments. The exemplary vehicle system 400 includes a first camera 410, a second camera 412, a LiDAR 430, a LiDAR processor 435, an image processor 415, an ADAS processor 460, a user interface 465, a GPS 475 and a vehicle controller 455.

The first camera 410 may be mounted on a host vehicle with a forward field of view. The first camera 410 may be mounted to a host vehicle grill, behind a rear view mirror, or on the forward edge of the host vehicle roof. The first camera 410 may be configured to capture an image of the forward field of view and couple this image to the image processor 415. In addition, a second camera 412 may be mounted to one or more side view mirror housings with a second field of view that partially overlaps the forward field of view. In some exemplary embodiments, the image from the first camera 410 and an image captured by the second camera 412 may be combined by the image processor 415 to generate an extended view image including the first field of view and the second field of view. The first camera and the second camera may be configured to capture light in the 400 nm to 700 nm spectral range, or may include a long wave infrared camera sensor and/or a short wave infrared camera sensor.

The LiDAR 430 including a LiDAR resonator according to the exemplary embodiments is configured to transmit a light pulse at a known azimuth and elevation and to receive a reflection of the light pulse from a distal object. The LiDAR 430 and/or the LiDAR processor 435 may determine a distance to the distal object in response to the propagation time of the light pulse. The LiDAR 430 may couple this distance measurement for the known azimuth and elevation to the LiDAR processor 435 for generation of a depth map and/or a point cloud. A depth map includes distances for a plurality of azimuth and elevation angles to generate a depth representation of the field of view of the LiDAR 430. A point cloud is a three dimensional visualization of the depth map. LiDAR systems typically utilize light in the 750 nm to 1500 nm range. Advantageously, light pulses transmitted by the LiDAR 430 may illuminate the field of view with the reflected light being captured by a detector within an optical module.

Images captured by the first camera 410, and the second camera 412 may be coupled to the image processor 415 for further processing to enable object detection for input to an ADAS algorithm. Further processing may include invert or linearized gamma correction, histogram equalization, and edge detection. The image processor 415 may then be configured to combine the data from the plurality of received images into a fused image. The fused image may have an increased field of view, increased dynamic range and/or increased resolution from each of the individual images. The image processor 415 may then perform invert or linearized gamma correction, histogram equalization, and edge detection on the fused image. Object detection and classification may then be performed using the results of the image processing on the fused image and the resulting data coupled to the ADAS processor 460. The object detection on either the fused image or the image from the first camera 410 may be performed using a trained neural network. The results of the object detection may be used to further train the neural network.

The results of object detection and the point cloud or depth map may be then coupled as an input to the ADAS processor 460. The ADAS processor 460 may use the detected object information, point cloud, map data stored in a memory 470, location data received in response to a GPS 475 to generate a localized area map relative to the host vehicle. The ADAS processor 460 may further be operative to generate control signals in response to an ADAS algorithm for coupling to the vehicle controller 455 for controlling the host vehicle. For example, the ADAS algorithm may perform an adaptive cruise control operation and generate steering, braking and throttle control information for coupling to the vehicle controller 455. Alternatively, the ADAS controller may generate a motion path in response to the detected object information and LiDAR point cloud and couple this motion path to the vehicle controller 455.

The user interface 465 may be configured to receive a user input for initiating an ADAS algorithm. In addition, the user interface 465 may be configured to display user alerts, user warnings, and/or ADAS system feedback to a vehicle operator in response to a user alert control signal generated by the ADAS processor 460 and/or the vehicle controller 455.

Figure 5:
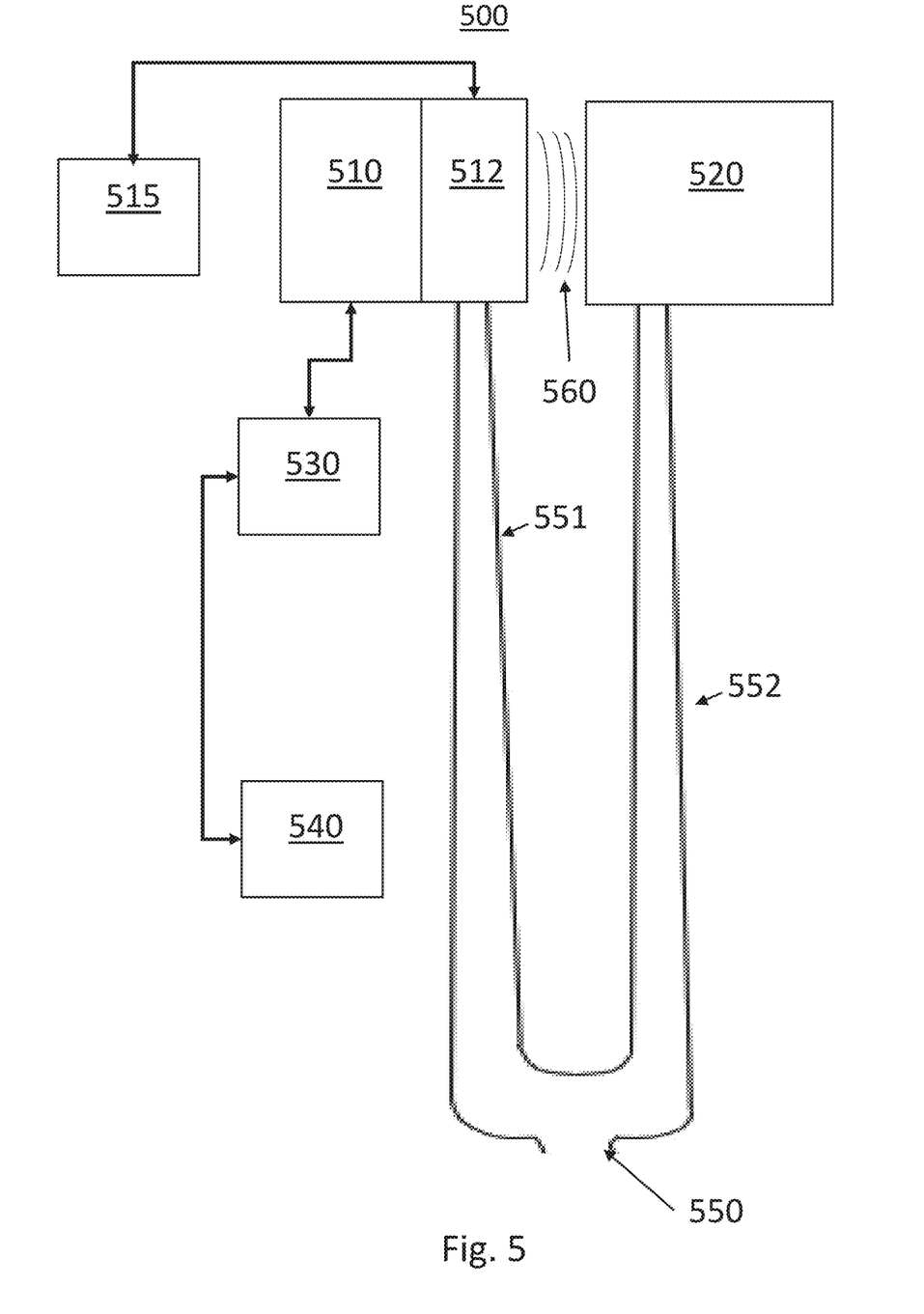
FIG. 5 is another LiDAR resonator with dynamic equilibrium design in accordance with an embodiment.

Turning now to FIG. 5, an exemplary LiDAR resonator 500 with dynamic force equilibrium is shown in accordance with various embodiments. The exemplary LiDAR resonator 500 may include a spring fork mechanism 550 having a first tine 551 and a second tine 552, an optical module 510, a voice coil 512, a counterweight 520, a signal source 515, a LiDAR processor 530 and a vehicle controller 540.

The spring fork mechanism 550 is configured to resonate at a resonant frequency. In some embodiments, resonant frequency may be 120 Hz in the vertical direction and 125 Hz in the lateral direction. To reduce external vibration and noise, it is desirable that the spring fork mechanism 550 have an out of phase resonance. For example, for an out of phase resonance, the first tine 551 will move in a direction opposite of the second tine 552

The optical module 510 may be mounted to the first tine 551 and may be operative for transmitting a light pulse and receiving a reflection of the light pulse. The optical module 510 may be configured with a transmit light pulse rate of 8 kHz. In some exemplary embodiments, the optical module 510 may transmit light pulses at a plurality of angles in response to a lateral motion of the first tine generated by the resonance of the spring fork mechanism 550. For example, if the optical module 510 is configured to transmit with an 8 kHz pulse rate and the spring fork mechanism 550 is resonant at 125 Hz, the optical module 510 may transmit at 64 different transmit locations resulting from the lateral and vertical movement of the end of the first tine 551.

The voice coil 512 is operative for generating an alternating magnetic field at the resonant frequency. The voice coil 512 may be mounted to the first tine 551 and may be collocated with the optical module 510. The alternating magnetic force generated by the voice coil 512 is directed towards the counterweight 520 on the second tine 552 and is operative to sustain a resonance of the spring fork mechanism 550, such as an out of phase resonance of the spring fork mechanism 550. In some exemplary embodiments, the voice coil may be integrated into the optical module 510. Alternatively, the voice coil 512 may be collocated with the counterweight 520 on the second tine, and a magnetic surface may be applied to a portion the optical module 510 such that the alternating magnetic force generated by the voice coil 512 is directed towards the magnetic surface.

The counterweight 520 may be mounted to the second tine and having a mass equal to a mass of the optical module 510 and a mass of the voice coil 512. The counterweight may be a magnet, may include a magnet, or may have a magnetic surface. Preferably, a magnetic portion of the counterweight 520 may be located proximate to the voice coil 512.

The exemplary LiDAR resonator 500 may further include a signal source 515 for coupling an alternating current signal at the resonant frequency to the voice coil 512 such that the voice coil 512 is operative to generate an alternating magnetic force at the resonant frequency between the voice coil 512 and the counterweight 520. The signal source 515 may be integrated with the voice coil 512 or may be integrated with the optical module 510. In some exemplary embodiments, the signal source may generate a 120 Hz and/or 125 Hz sinusoidal electric signal for providing to one or more voice coils.

The LiDAR resonator 500 may further include a LiDAR processor 530 for receiving data related to pulse transmission and detection which may be used by the processor 530 to generate the depth map and/or a point cloud for the field of view. This depth map and/or point cloud may be provided to a vehicle controller 540 for controlling a vehicle during advanced driver assistance systems (ADAS) operations, such as adaptive cruise control, or autonomous vehicle control. The LiDAR resonator may further include a lens mechanically coupled to a base of the spring fork mechanism 550 such that the light pulse transmitted by the optical module is transmitted through the lens.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An apparatus comprising:
   a spring fork mechanism having a first tine and a second tine wherein the spring fork mechanism is configured to resonate at a resonant frequency and wherein a stiffness of the first tine equals a stiffness of the second tine;
   an optical module, mounted to the first tine, configured to transmit a light pulse and receiving a reflection of the light pulse;
   a voice coil, mounted to the first tine, configured to generate an alternating magnetic force at the resonant frequency
   a counterweight, mounted to the second tine, having a mass and center of gravity equal to a mass and center of gravity of the optical module and the voice coil, wherein the counterweight includes a magnet; and
   a signal source configured to couple an alternating current signal at the resonant frequency to the voice coil such that the voice coil is operative to generate the alternating magnetic force at the resonant frequency between the voice coil and the counterweight.

2. The apparatus of claim 1 wherein the alternating magnetic force sustains a resonance of the spring fork mechanism.

3. The apparatus of claim 1 wherein the alternating magnetic force sustains an out of phase resonance of the spring fork mechanism.

4. The apparatus of claim 1 wherein the voice coil is integrated with the optical module.

5. The apparatus of claim 1 wherein the signal source is integrated with the voice coil.

6. The apparatus of claim 1 wherein the signal source is integrated with the optical module.

7. The apparatus of claim 1 wherein the light pulse is transmitted at a plurality of positions in response to a lateral and vertical motion of the first tine.

8. The apparatus of claim 1 further comprising a lens mechanically coupled to a base of the spring fork mechanism such that the light pulse is transmitted through the lens.

9. The apparatus of claim 1 wherein the spring fork mechanism is resonant at 125 Hz.

10. A method comprising:
    mechanically coupling a voice coil and an optical module to a first tine of a spring fork mechanism and a counterweight to a second tine of the spring fork mechanism wherein the spring fork mechanism has a resonant frequency;
    inducing, by the voice coil, an alternating magnetic force between the optical module and the counterweight to sustain a resonance of the spring fork mechanism at the resonant frequency;
    transmitting, by the optical module, a first light pulse at a first angle in response to a first position of the first tine and a second light pulse at a second angle in response to a second position of the first tine;
    generating a depth map in response to a reflection of the first light pulse received by the optical module at the first position and a reflection of the second light pulse received by the optical module at the second position; and
    controlling a vehicle in response to the depth map.

11. The method of claim 10 wherein the voice coil is integrated within the optical module.

12. The method of claim 10 wherein the counterweight is magnetic.

13. The method of claim 10 wherein the first light pulse and the second light pulse are transmitted through a lens mechanically coupled to a non-resonant portion of the spring fork mechanism.

14. The method of claim 10 further including coupling a signal, from a signal source, to the voice module at the resonant frequency.

15. The method of claim 10 wherein the spring fork mechanism forms part of a LiDAR resonator.

16. The method of claim 10 wherein the vehicle is controlled in response to an assisted driving algorithm.

17. The method of claim 10 wherein the voice coil is operative to induce an out of phase resonance of the spring fork mechanism.

18. The method of claim 10 wherein the optical module is mounted to an end of the first tine of the spring fork mechanism.

19. A vehicle comprising:
    a lidar including a spring fork mechanism having a first tine with a first stiffness and a second tine with the first stiffness, wherein the spring fork mechanism is configured to resonate at a resonant frequency, an optical module, mounted to the first tine, for transmitting a light pulse and receiving a reflection of the light pulse, a voice coil, mounted to the first tine, for generating an alternating magnetic field at the resonant frequency, and a counterweight, mounted to the second tine, having a mass and center of gravity equal to a mass and center of gravity of the optical module and the voice coil;
    a signal source for coupling an alternating current signal at the resonant frequency to the voice coil such that the voice coil is operative to generate an alternating magnetic force at the resonant frequency between the voice coil and the counterweight;

a processor for generating a depth map in response to a transmission time of the light pulse and a detection time of the reflection of the light pulse;

a memory for storing the depth map; and a vehicle controller for controlling the vehicle in response to an assisted driving algorithm and the depth map.

20. The vehicle of claim 19 wherein the alternating magnetic force sustains an out of phase resonance of the spring fork mechanism.

* * * * *